(12) United States Patent
Gabriel et al.

(10) Patent No.: US 6,341,581 B1
(45) Date of Patent: Jan. 29, 2002

(54) MULTISPECIES RODENT CAGE

(75) Inventors: George S. Gabriel, Seaford, DE (US); Neil E. Campbell, Eden; Chin Soo Park, Salisbury, both of MD (US); Albert P. Ruggieri, Flourtown, PA (US); John E. Sheaffer, Perryville, MD (US); Dale Murray, Elkron, MD (US); Eric A. Deitrich, Woodbine, MD (US); Lynn Irwin, Seaford, DE (US); Rodney Gerringer, Belcamp, MD (US)

(73) Assignee: Lab Products, Inc., Seaford, DE (US)

( * ) Notice: Subject to any disclaimer, the term of this patent is extended or adjusted under 35 U.S.C. 154(b) by 0 days.

(21) Appl. No.: 09/521,198

(22) Filed: Mar. 7, 2000

Related U.S. Application Data

(63) Continuation of application No. 09/106,389, filed on Jun. 26, 1998, now Pat. No. 6,041,741.

(51) Int. Cl.⁷ ............................ A01K 1/03; A01K 39/04
(52) U.S. Cl. ........................................ 119/419; 119/475
(58) Field of Search .............................. 119/417, 419, 119/454, 452, 475

(56) References Cited

U.S. PATENT DOCUMENTS

| | | | |
|---|---|---|---|
| 3,002,492 A | 10/1961 | Naturale | 119/475 |
| 3,212,474 A | 10/1965 | Higgins et al. | 119/475 |
| 3,334,614 A | 8/1967 | Gass et al. | 119/475 |
| 3,537,428 A | 11/1970 | Montgomery et al. | 119/18 |
| 4,480,587 A | 11/1984 | Sedlacek | 119/15 |
| 4,593,650 A * | 6/1986 | Lattuada | 119/419 |
| 4,640,228 A * | 2/1987 | Sedlacek et al. | 119/419 |
| 4,690,100 A | 9/1987 | Thomas | 119/15 |
| 4,907,536 A | 3/1990 | Chrisler | 119/15 |
| 5,524,573 A | 6/1996 | Hart | 119/489 |
| 5,735,233 A * | 4/1998 | Deitrich et al. | 119/452 |
| 5,794,567 A | 8/1998 | Itzhak | 119/416 |
| 5,924,384 A | 7/1999 | Deitrich et al. | 119/419 |
| 6,041,741 A * | 3/2000 | Gabriel et al. | 119/417 |

FOREIGN PATENT DOCUMENTS

| | | | | |
|---|---|---|---|---|
| DE | 2505502 | * | 8/1975 | 119/475 |
| FR | 1266373 | * | 5/1961 | 119/475 |
| GB | 2 332 612 | | 6/1999 | |
| JP | 9-238589 | * | 9/1997 | 119/475 |

* cited by examiner

*Primary Examiner*—Peter M. Poon
*Assistant Examiner*—Son T. Nguyen
(74) *Attorney, Agent, or Firm*—Stroock & Stroock & Lavan LLP

(57) ABSTRACT

A rodent cage including a cage bottom having a plurality of integral side walls, a floor and an open top end. A peripheral lip extends continuously around the top end. A pair of recesses are disposed on the peripheral lip. A feeder assembly has a frame and at least one section descending therefrom. The frame has pair of flanges extending therefrom so that when the feeder assembly is disposed in the cage bottom the pair of flanges are mated with the pair of recesses, respectively. A bonnet is dimensioned in size for sealing the top end of the cage bottom. A lock is disposed on the bonnet for preventing rodents housed in the cage from displacing the bonnet from the cage bottom.

31 Claims, 5 Drawing Sheets

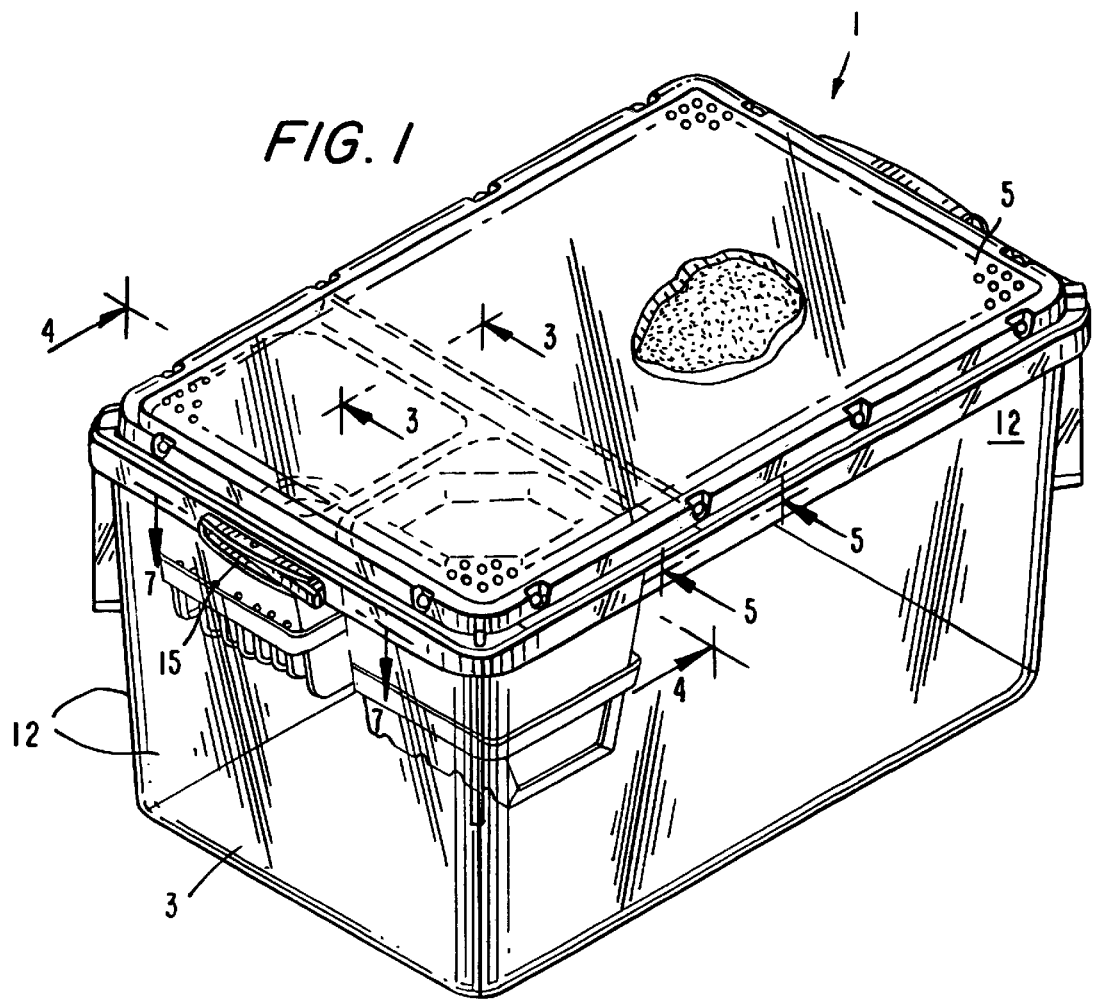
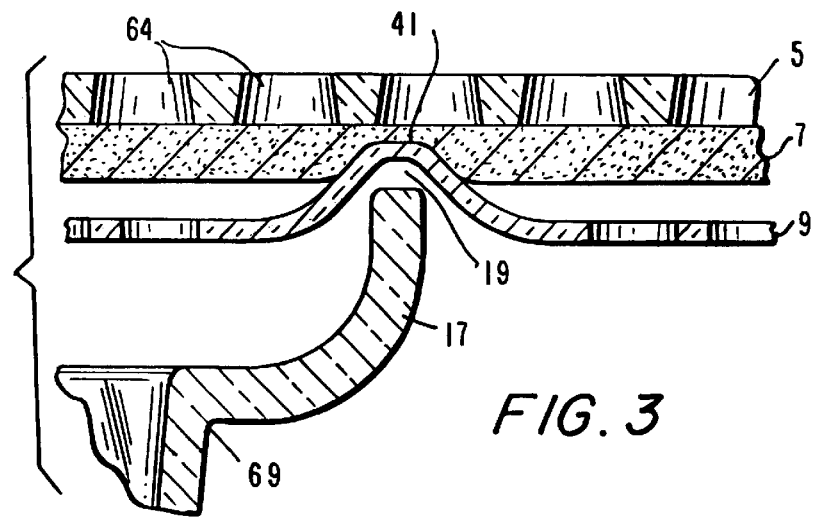

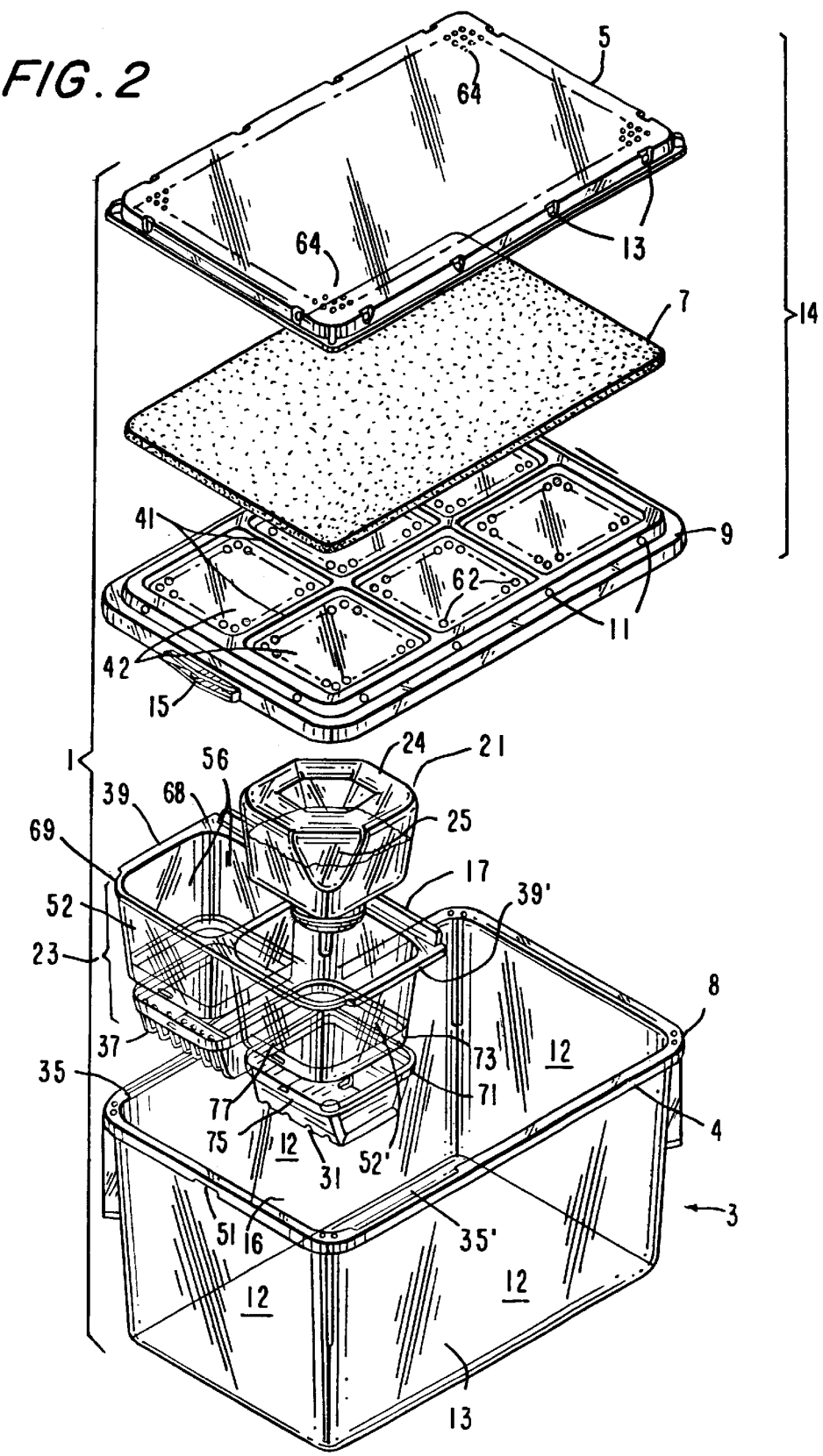

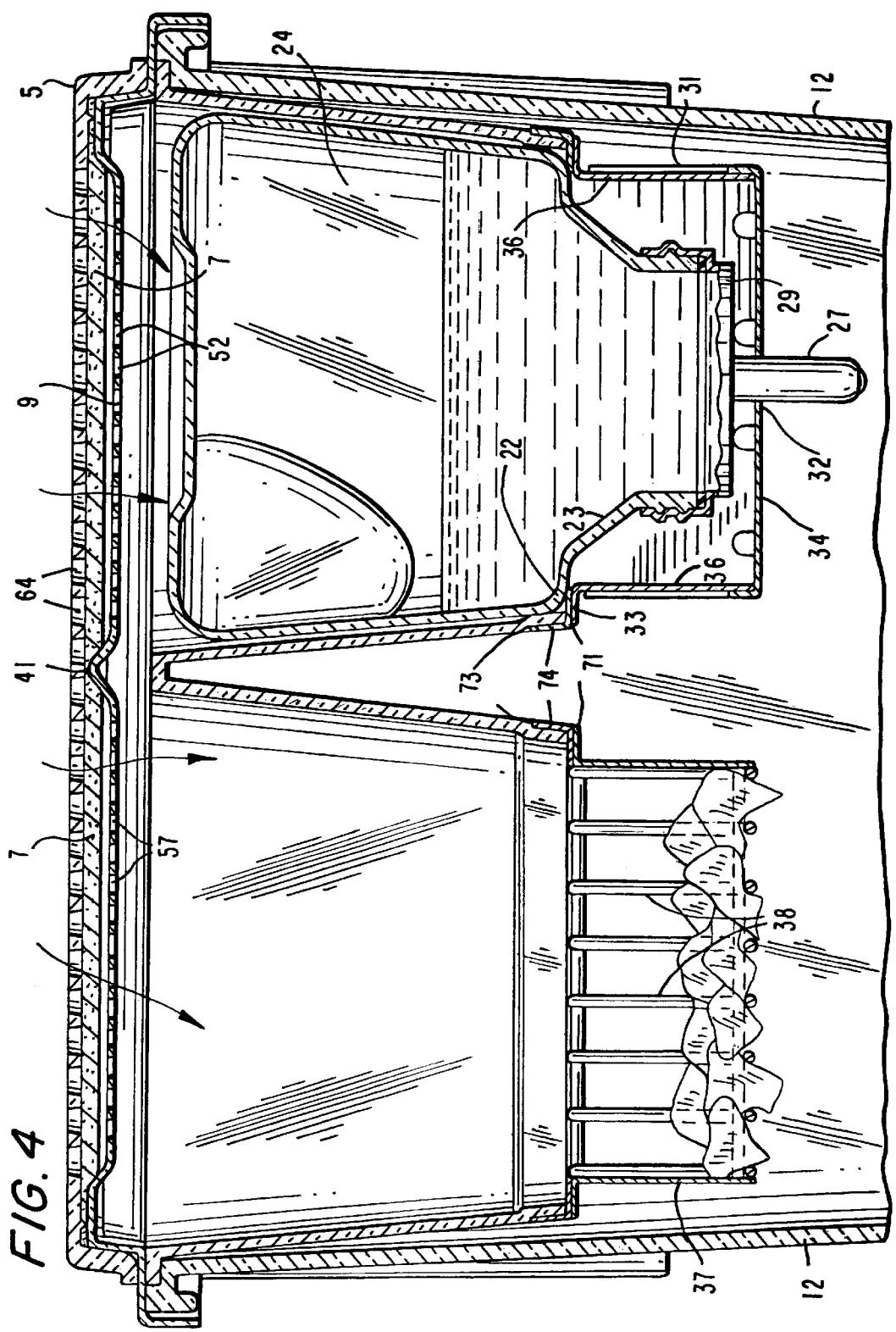

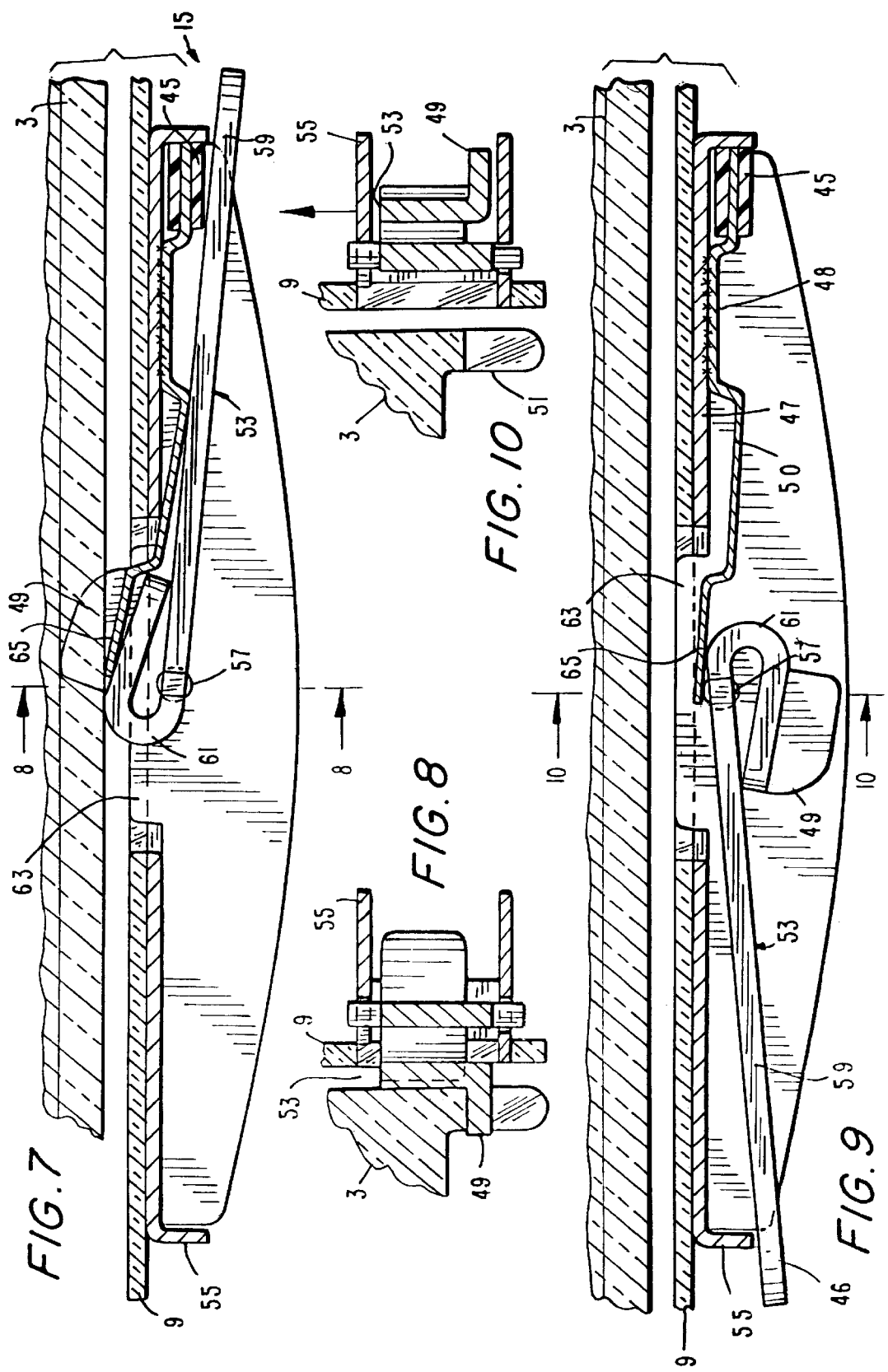

MULTISPECIES RODENT CAGE

CROSS REFERENCE TO RELATED APPLICATIONS

This is a continuation of U.S. patent application Ser. No. 09/106,389 filed on Jun. 26, 1998 U.S. Pat. No. 6,401,741.

BACKGROUND OF INVENTION

This invention relates generally to a rodent cage which may be used as a static unit or in connection with a ventilated cage and rack system and, in particular, to a rodent cage that may be used for a variety of rodent types including but not limited to rats, mice, gerbils, hamsters and guinea pigs.

Ventilated cage and rack systems are well known in the art. One such ventilated cage and rack system is disclosed in U.S. Pat. No. 4,989,545, assigned to Lab Products, Inc., in which an open rack system including a plurality of shelves, each formed as an air plenum is provided. A ventilation system is connected to the rack system for ventilating each cage in the rack.

In prior art ventilated cage and rack systems, cages of different sizes are used to accommodate rodents of different types. These sizes are selected according to Institute Laboratory Animal Resources (ILAR) guidelines which set non-binding minimums for the size and dimension of cages for particular rodents. For example, for mice that weigh more than 25 grams, a cage having a dimension of at least 15 square inches per mouse is required. Similarly, rats up to 400 grams in size require a cage of at least 40 square inches per rat. Similar requirements are mandated for hamsters and guinea pigs by the Animal Welfare Act (AWA).

A drawback of the prior art cages is that a variety of different cage sizes, necessary to support the different rodent types, must be inventoried and managed so that the appropriate cage size is available for a particular study. This problem is exacerbated in large research facilities, for example, the National Institute of Health (NIH), where 20 to 30 different cage sizes have to be coordinated. Furthermore, each different cage size requires that the corresponding rack that supports the particular cage size and corresponding accessories be used. This forces the facility to inventory and manage a variety of different rack sizes as well. Accordingly, it would be desirable to provide a single cage size which is suitable for different rodent types thereby simplifying the maintenance of cage and rack systems.

The prior art cages include a cage bottom having four walls and a base with an open top. A wire bar lid, that stretches across the top of the cage bottom and extends into the cage bottom, is disposed between the cage bottom and bonnet. A bonnet supporting an air filter thereon is placed on top of the cage bottom wire bar lid thereby covering the cage bottom. The wire bar lid is constructed from stainless steel and supports food and water in the cage while also preventing the rodents, particularly rats, from gnawing through the bonnet and damaging the filter or escaping from the cage.

Several problems exist with the use of the wire bar lid in the prior art cage design. First, because the wire bar lid extends into the cage bottom, it creates an artificial ceiling between the cage bottom and the bonnet thereby reducing the amount of area and height available for the rodents. Also the wire bar lid must be removed to provide access to the animal requiring labor and work space for placing the lid during use. Also, the wire bar lid prevents the bonnet from sitting flush on the cage bottom thereby allowing air to either escape or enter the cage bottom over the lid wires creating a Venturi effect in a ventilated cage environment. Although this problem is most pronounced when rounded wire bar lids are used, it nevertheless exists even when flat rimmed wire bar lids are employed. Accordingly, it is desirable to provide a rodent cage in which a wire bar lid is not required so that the usable area for rodents is maximized and ventilation to the cage is improved.

SUMMARY OF THE INVENTION

The present invention is for a rodent cage used in various rack systems that can support a variety of rodent types. In accordance with the present invention, the rodent cage includes a cage bottom having a plurality of integral side walls, a floor and an open top end. A peripheral lip extends continuously around the top end and a pair of recesses are formed in the peripheral lip. A feeder assembly has a frame and at least one section descending therefrom. The frame has a pair of flanges extending therefrom so that when the feeder assembly is disposed in the cage bottom, the pair of flanges is received within the respective recesses. A bonnet is placed on the top of the cage bottom and is dimensioned and sized for sealing the cage bottom. A lock is disposed on the bonnet for preventing rodents in the cage from displacing the bonnet from the cage bottom.

Accordingly, it is an object of the present invention to provide a rodent cage that can be used to house different rodent types.

Another object of the present invention is to provide a rodent cage with an efficient size for a variety of rodents.

Another object of the present invention is to provide a rodent cage having more useable space while protecting a filter from damage.

Yet another object of the invention is to provide a cage which reduces the ability of rats to damage the cage by gnawing.

Still another object of the invention is to provide a simple structure for locking the bonnet to the cage bottom.

Still other objects and advantages of the invention will in part be obvious and will in part be apparent from the specification.

The invention accordingly comprises the features of construction, combination of elements and arrangements of parts which will be exemplified in the construction here and after set fort, the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of the multispecies rodent cage constructed in accordance with the present invention;

FIG. 2 is an exploded perspective view of the multispecies rodent cage constructed in accordance with the invention;

FIG. 3 is a cross sectional view taken along line 3—3 of FIG. 1;

FIG. 4 is a cross sectional view taken along line 4—4 of FIG. 1;

FIG. 7 is a cross sectional view taken along line 7—7 of FIG. 1;

FIG. 8 is a cross sectional view taken along line 8—8 of FIG. 7;

FIG. 9 is a cross sectional view of a lock constructed in accordance with invention in the unlocked position; and FIG. 10 is a cross sectional view taken along line 10—10 of FIG. 9.

DETAILED DESCRIPTION OF THE PREFERRED EMBODIMENTS

Figure 5:
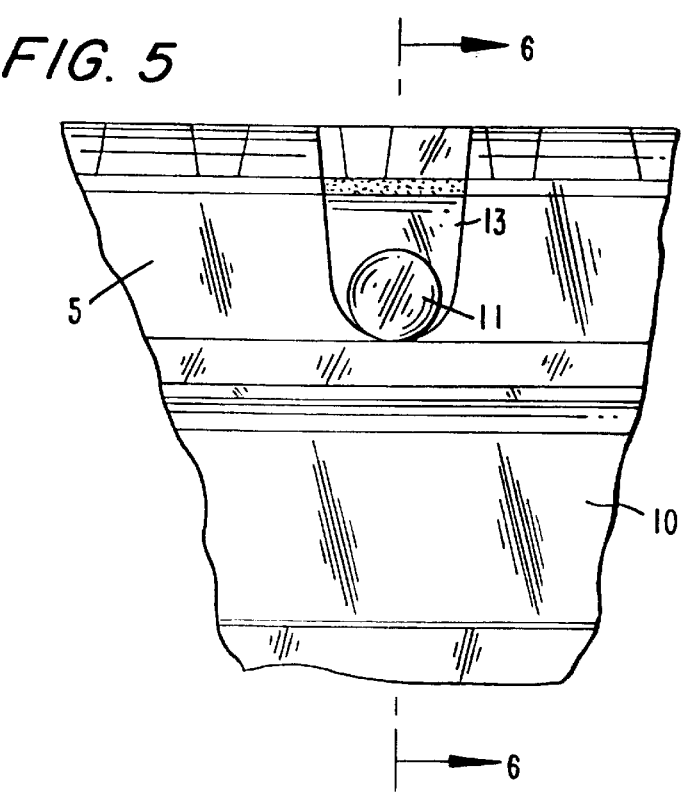
FIG. 5 is a cross sectional view taken along line 5—5 of FIG. 1.
Figure 6:
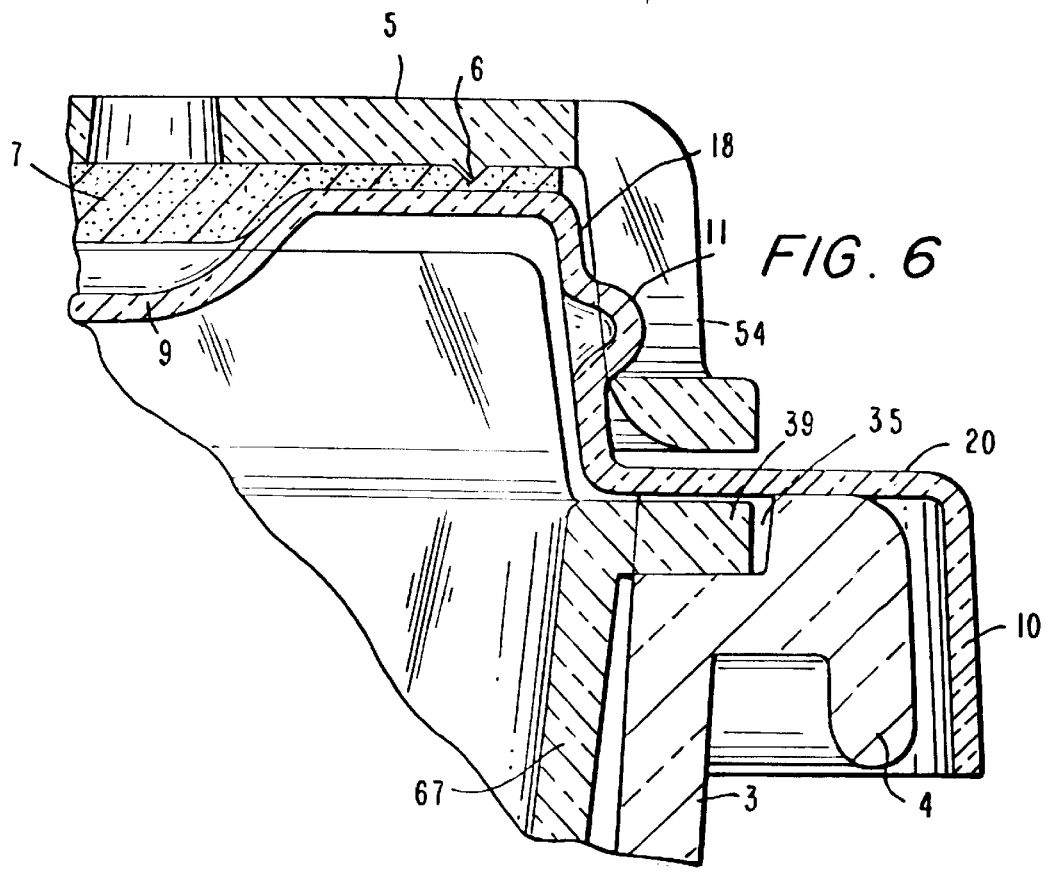
FIG. 6 is a cross sectional view taken along line 6—6 of FIG. 5.

Referring now to FIGS. 1–6, there is shown a rodent cage 1 constructed in accordance with the present invention. Rodent cage 1 includes a cage bottom 3 having four integral side walls 12 and a floor 13. Cage bottom 3 also includes an open top end 16. Extending continuously around top end 16 of cage bottom 3 is a peripheral lip 8 having a smooth and flat surface. A rim 4 vertically descends from peripheral lip 8. A pair of recesses 35, 35' are formed in peripheral lip 8. In an exemplary embodiment, recess 35 is disposed in the portion of peripheral lip 8 adjacent a corner of cage bottom 3 while recess 35' is disposed in the portion of peripheral lip 8 that is opposite recess 35.

Although cage bottom 3 may be constructed from any suitable material, it is preferable that it be molded from transparent plastic so that the rodents contained in cage bottom 3 can be monitored through side walls 12. Also, it is preferred that cage bottom 3 have rounded corners thereby preventing the rodents, and in particular rats, from purchasing on the corners and gnawing their way out of cage 1.

The dimension of sage bottom 3 is optimized to permit the housing of different rodent types, including mice, rats, hamster, gerbils and guinea pigs in conformance with ILAR and AWA guidelines. In a preferred embodiment, cage bottom 3 is selected to have a size of approximately 80 square inches measured at the bottom of cage bottom 3 with a depth of approximately 7⅝ inches. Because many studies can begin housing two rats per cage, cage bottom 3 having an area of about 80 square inches can support two rats of up to 400 grams each. Once the rats grow, for example, in long-term studies, they will be placed in their own individual cages. Also, cage bottom 3 having an area of about 80 square inches can accommodate either a guinea pig or at least five mice while complying with ILAR and AWA guidelines. Thus, by selecting cage bottom 3 having an area of about 80 square inches, a single cage 1 can be used to support a variety of rodent types. Accordingly, by standardizing cage bottom 3 having this dimension, a research facility will greatly simplify the inventory and management of cages 1 and racks.

A feeder assembly, generally indicated as 23, is supported in cage bottom 3 for providing food and water to the rodents housed therein. Feeder assembly 23 includes a frame 69 having a platform portion 68.

Extending from two opposite sides of platform 68 are a pair of flanges 39, 39'. Flanges 39, 39' extend outwardly from frame 69 with flange 39 disposed on one side of frame 69 and flange 39' disposed on the opposite side of frame 69. Flanges 39, 39' may be either integrally formed with frame 69 or separately formed and then fixed to frame 69 thereafter. Flanges 39, 39' are dimensioned and shaped so that when feeder assembly 23 is disposed in cage bottom 3, flanges 39, 39' are received in recesses 35, 35', respectively, and are flush with peripheral lip 8 of cage bottom 3.

A lip 17 extends along a front of platform 68 which is intermediate the sides of frame 69 containing flanges 39, 39'. Lip 17 extends upward and away from frame 69. Feeder assembly 23 is placed in cage bottom 3 so that lip 17 extends toward the center of cage 1. In an exemplary embodiment, lip 17 is smooth and curved to prevent rodents in cage bottom 3 from perching on lip 17 or feeder assembly 23 to either gain access to the food and water contained in feeder assembly 23 from above or from purchasing for gnawing at feeder assembly 23. Also, lip 17 serves as a handle for positioning feeder assembly 23 in cage bottom 3.

A first support 52 and a second support 52' depend from platform 68 and form open ended polygons suspended therefrom. Supports 52, 52' have sides 56. Supports 52 and 52' of feeder assembly 23 can be adapted to support either food or water for the rodents housed in cage bottom 3. To adapt support 52 for food, a snap on food holder 37 is attached to the bottom of support 52. A skirt 73 is disposed around the circumference of the bottom of supports 52, 52'. Food holder 37 includes a peripheral rim 71. Descending from peripheral rim 71 is a plurality of U-shaped bars 38 on food holder 37. U-shaped bars 38 are spaced apart so that food disposed in support 52 is retained by food holder 37 but yet allows the rodents in cage bottom 3 to remove the food from between U-shaped bars 38 of food holder 37. Rim 71 is dimensioned to receive channel 74 and secure rim 71 to support 52 or 52'. It also provides a flush continuous surface eliminating purchase points and protecting the edges of skirt 73 from the animal. A recess 77 is disposed on skirt 73. A lock tab 75 is disposed on rim 71. Lock tab 75 and recess 77 are dimensioned and positioned so that when food holder 37 is connected to support 52, lock tab 75 is inserted into recess 77 thereby securing food holder 37 to support 52. In a preferred embodiment rim 71 is flush with the side 56 of support 52 or 52' so that rodents cannot perch on rim 71 or sides 56. In a preferred embodiment, food holder 37 is constructed from stainless steel so that the rodents are prevented from gnawing through food holder 37 and support 52.

Either support 52 or 52' may also be adapted to receive a water bottle 21 to provide water to the rodents in cage bottom 3. To adapt support 52 for water, a water bottle support 31 is secured to the bottom of support 52. As with food holder 37, water bottle support 31 includes a rim 71 having a recess 77 so that when rim 71 is placed about skirt 73 of support 52, recess 77 mates with lock tab 75 and rim 71 fits about skirt 73 so that rim 71 is flush with the sides 56 of support 52. Descending from rim 71 of water bottle support 31 are four integral walls and a floor 34. The walls 36 of water bottle support 31 are inwardly offset from rim 71 of water bottle support 31 thereby forming a shoulder 33 between walls 36 and rim 71 around the inside circumference of water bottle support 31. A floor 34 is supported by walls 36. Located in the center of floor 34 is a hole or slot 32. In a preferred embodiment, water bottle support 31 is constructed of stainless steel so that the rodents in cage bottom 3 are prevented from gnawing through water bottle support 31 and support 52.

It is preferred that supports 52 and 52' be constructed from transparent plastic so that the food levels in supports 52 and 52' can be monitored through side walls 12. Supports 52 and 52' may be formed in any suitable shape including conical and rhomboidal but are preferably a rounded polygon to prevent chewing and maximize volume. Supports 52, 52' are radiused at the corners to sufficiently prevent chewing by the animal. Studies have shown that by way of example a radius of about 1 inch at the top tapering to ⅞ of an inch at the bottom has been sufficient. Support 31 and feeder holder 37 may also be formed of plastic. The corners would be sufficiently radiused to prevent gnawing by the animal.

Because supports 52, 52' can each hold both food or water it is possible to double the food capacity by utilizing two feedholders 37 and a rack watering valve (not shown). This extends the life of the study and reduces the number of times that the top must be removed.

Water bottle 21 includes a main body 24 for containing water that is preferably dimensioned and shaped to mate with support 52. Main body 24 substantially fills support 52 so that the water capacity of water bottle 21 is maximized. It is also preferable that main body 24 be constructed from a transparent material so that the amount of water remaining in water bottle 21 can be monitored through side walls 12 and the walls of supports 52, 52'. The top portion of main body 24 includes a pair of molded recesses 25 disposed on opposite sides of main body 24 so that water bottle 21 may be easily gripped and removed from support 52. Water bottle 21 is positioned in support 52 in a substantially vertical orientation so that substantially all the water stored in water bottle 21 will drain out therefrom.

Main body 24 is tapered in a manner which forms a shoulder 22 around the circumference of main body 24 which extends into a neck 23. As a result, when water bottle 21 is placed in support 52, shoulder 22 contacts ledge 33 of support 52 thereby supporting water bottle 21 in support 52.

Neck 23 of main body 24 narrows to an opening into which a rubber stopper 29 is inserted or screw cap is placed. A tube 27 extends from rubber stopper 29. When water bottle 21 is placed into support 52, tube 27 is inserted through the hole or slot in floor 34 of water bottle support 31 and extends into cage bottom 3 thereby providing the rodents in cage bottom 3 with access to the water in water bottle 21.

Top end 16 of cage bottom 3 is covered with a bonnet 14. Bonnet 14 includes three parts that are connected together into one unit: a top 9, a filter 7 and a filter retainer 5. The parts of bonnet 14 are arranged so that top 9 is in direct contact with top lip 8 of cage bottom 3, filter 7 is disposed on top 9 and filter retainer 5 is placed on top filter 7 and is secured to top 9 thereby forming a unitary structure.

In an exemplary embodiment, top 9 is dimensioned and shaped to cover and effectively seal top end 16 of cage bottom 3. Top 9 is formed from a resilient material, by way of example stainless steel or plastic designed without purchase points, so that the rodents in cage 1 are prevented from gnawing through bonnet 14 to filter 7. Top 9 is also perforated, having a plurality of air passages 62, across its surface so that air can pass through top 9 into cage bottom 3. The top surface of top 9 includes a series of cross beams 41 for supporting filter 7 away from the holes separating filter 7 from access by the animals contained within the cage. Cross beams 41 divide the surface of top 9 into a plurality of areas 42.

Opposite cross beams 41 on the bottom surface of top 9 are a series of receiving portions 19. As seen in FIG. 3, receiving portions 19 are dimensioned and shaped so that when top 9 is placed on cage bottom 3 containing feeder assembly 23, lip 17 is introduced in receiving portion 19 that is adjacent lip 17 thereby creating a barrier to supports 52 and 52' of feeder assembly 23. In this way, rodents in cage bottom 3 are prevented by lip 17 from gaining access to the food or water in support 52 from above. This also prevents access to lip 17 by the animal, preventing chewing of lip 17 itself. Also, because top 9 will not be properly seated on cage bottom 3 unless lip 17 is mated with receiving portion 19, this ensures that feeder assembly 23 is properly positioned in cage bottom 3 before cage 1 is closed by bonnet 14.

Along the periphery of top 9 is a descending rim 18. Disposed on rim 18 and protruding from top 9 are a plurality of detents 11. Extending from descending rim 18 along the periphery of top 9 is a horizontal flange 20. Vertically descending from flange 20 is a skirt 10. When top 9 is placed on cage bottom 3, flange 20 is seated flush on peripheral lip 8 of cage bottom 3 thereby minimizing the amount of air that flows out from the perimeter of top 9 thus maximizing the air flowing through filter 7. Also, because flanges 39, 39' of feeder assembly 23 are positioned within recesses 35, 35' and are flush with peripheral lip 8, top 9 forms a seal with cage bottom 3 along the entire periphery of cage bottom 3. Furthermore, skirt 10 which extends around rim 4 improves the seal formed between top 9 and cage bottom 3 by creating a circuitous path for air travel between the interior of cage 1 and the outside thereby inhibiting air from entering or leaving cage 1 at this junction point. In a exemplary embodiment, an additional sealing member, for example silicon or rubber material, may be applied to either or both flange 20 or peripheral lip 8 thereby providing an O-ring type seal further limiting air passage via this route.

Filter 7 is placed on top of top 9 and is supported by cross beams 41 away from areas 42 to prevent contact with rodents. Filter retainer 5 is placed on top of filter 7 and is dimensioned and shaped so as to cover the entire filter 7. Filter retainer 5 is also perforated, containing holes 64 throughout its surface thereby allowing air to pass through filter 7. Protruding from the bottom surface of filter retainer 5 and extending around the bottom surface of filter retainer 5 is a track 6. When filter retainer 5 is mounted on filter 7, track 6 compresses filter 7 against the top surface of top 9 thereby securing filter 7 in place and preventing air from leaking past the filter in any direction.

A descending border 54 extends from the outer periphery of filter retainer 5. A plurality of windows 13 are formed in border 54 of filter retainer 5. Windows 13 are dimensioned and positioned so that when filter retainer 5 is mounted on top of filter 7, windows 13 receive detents 11 of top 9, respectively, thereby securing filter retainer 5 to top 9. In this way, filter retainer 5, filter 7 and top 9 of bonnet 14 form a unitary structure.

Top 9 may be made of plastic. To further prevent the animal from perching on top 9, air passages 62 are radiused to provide a smooth curved surface facing the animal. Passages 62 are also dimensioned to prevent the animal's nose, claws or teeth from reaching the filter.

Reference is now made to FIGS. 7–10. A lock 15 is mounted on skirt 10 of top 9. Lock 15 includes a channel-shaped lock housing 55 that is fixed to skirt 10. Lock spring 47, disposed in housing 55, includes a visual alert 45 portion upon which is mounted a visual alert 46, a securing portion 48, a tension portion 50 and a biasing portion 65. Lock spring 47 is positioned in housing 55 so that biasing portion 65 is adjacent the center of housing 55. Lock spring 47 is secured to housing 55 by connecting securing portion 48 to the back wall of housing 55 using any suitable technique, such as welding or gluing. In an exemplary embodiment, lock spring is constructed from a hard, resilient material, such as a strip of metal, and is shaped so that visual alert portion 45 and tension portion 50 are spaced away from the back wall of housing 55. Mounted in the center of housing 55 is a pivot 57. Lock spring 47 is of a sufficient length so that biasing portion 65 extends to a point intermediate pivot 57 and the back wall of housing 55.

A lock bar 53 is disposed in housing 55 and includes an arm 59 and a curved portion 61 at an end of arm 59. Lock bar 53 is rotatably mounted on pivot 57 at an end of arm 59 that is adjacent curved portion 61. Lock bar 53 is of a sufficient length so that a portion of arm 59 extends outside housing 55 when lock 15 is in either the locked or unlocked position so that lock bar 53 may be easily gripped and rotated. A lock flange 49 extends horizontally from a lower edge of curved portion 61 of lock bar 53.

When lock bar 53 is rotated away from lock spring 47, lock flange 49 faces away from cage bottom 3 and lock 15 is in the unlocked portion. In this position, biasing portion 65 is biased against the portion of lock bar 53 that is adjacent pivot 57 thereby keeping lock bar 53 from rotating towards lock spring 47 and keeping lock 15 in the unlocked position. In the unlocked position, visual alert 45, preferably a readily visible member such as a yellow tab, is exposed indicating that lock 15 is unlocked.

When lock bar 53 is rotated to lock spring 47, lock flange 49 is inserted into a notch 51 disposed in cage bottom 3 thereby securing top 9 to cage bottom 3. While in the locked position, biasing portion 65 is biased against curved portion 61 of lock bar 53 at a point that is vertically adjacent to lock flange 49 thereby keeping lock bar 53 from rotating away from lock spring 47 and keeping lock 15 in the locked position. Also, because lock bar 53 covers visual alert 45 when lock bar 53 is rotated towards lock spring 47 into the locked position, the locked cage 1 are readily distinguishable from the unlocked cages 1.

Rodent cage 1 constructed in accordance with the present invention offers many advantages over prior art cages. First, because the dimension of cage bottom 3 is optimally selected to have a size of 80 square inches, cage 1 can be used for mice, rats, hamsters and guinea pigs while confirming to ILAR guidelines. By providing a universal cage size, the need for storing and managing different size cages and different size racks to support the different cage sizes is eliminated. Also, because feeder assembly 23 is modular and adaptable by snapping on either water bottle support 31 or food holder 37, as needed to support the varying eating requirements of the different studies and rodents, storage and maintenance of feeder assembly 23 is greatly simplified.

The durability and reliability of cage 1 of the present invention is also improved. Also, rounded lip 17, extending from feeder assembly 23, which is received by receiving portion 19 of top 9, prevents rodents from perching and accessing food in feeder assembly 23 from above. By radiusing supports 52, 52' of feeder 23, eliminates purchase points on the feeder. Furthermore, by mounting either water bottle support 31 or food holder 37, both made of stainless steel, to the bottom of supports 52, 52' of feeder assembly 23, the rodents are prevented from gnawing through the bottom of feeder assembly 23. Also, by forming top 9 from stainless steel, or radiusing passages 62 in plastic the rodents will be unable to gnaw through bonnet 14. Finally, by including lock 43 on bonnet 14, the rodents housed in cage bottom 3 will be unable to displace bonnet 14 and escape.

Furthermore, the ventilation of the cage is greatly improved by eliminating the wire lid that was used in prior art cages and reducing the Venturi effect therein. Also, because flanges 39, 39' are mounted flush in feeder recesses 35, 35', respectively, bonnet 14 forms an improved seal with cage bottom 3 preventing air from passing through this junction and forcing more air through filter 7. In addition, by providing a sealing member such as rubber or silicon along the junction between top 9 and cage bottom 3, the seal is further improved and ventilation through filter 7 is increased.

Cage 1 constructed in accordance with the present invention is also easier to use than the prior art cages. First, because cage bottom 3 is constructed from transparent material, visibility of the rodents in cage bottom 3 is improved. Also, by inserting feeder assembly 23 at the rear of cage bottom 3, visibility and access to the animals is improved. Furthermore, because sections 52, 52' of feeder assembly 23 is constructed from clear plastic, inspection of the food and water levels in feeder assembly 23 is facilitated without having to remove bonnet 14. By supporting the water bottle in a substantially vertical position, not only does substantially all of the liquid flow from the bottle, but the bottle utilizes less cage volume than if oriented at an angle. Also, by using water bottle 21 having molded recesses 25, the insertion and removal of water bottle 21 from section 52 is simplified and eliminating the step of separately removing the lid and setting it aside. In addition, because bonnet 14 is formed as a unitary structure, top 9, filter 7 and filter retainer 5 may be removed from cage bottom 3 in one piece thereby easing access to the interior of cage bottom 3. In addition, because filter retainer 5 may be removed from top 9 while top 9 is still secured to cage bottom 3, filter 7 may be inspected and changed while keeping the rodents securely locked in cage bottom 3. Finally, visual alert 45 of lock 43 simplifies the determination of which cages 1 are in the unlocked position.

It will thus be seen that the objects set forth above, and those made apparent from the preceding description, are efficiently obtained and, because certain changes may be made in the above constructions without departing from the spirit and scope of the invention, it is intended that all matter contained in the above description are shown in the accompanying drawings shall be interpreted as illustrative and not in an limiting sense.

It is also to be understood that the following claims are intended to cover all the generic and specific features of the invention herein described, and all statements of the scope of the invention which, as a matter of language, might be said to fall therebetween.

What is claimed is:

1. A rodent cage, comprising:
    a cage bottom having a plurality of integral side walls, a floor and an open top end, and a peripheral lip extending continuously around said top end;
    a feeder assembly having a frame and at least one support descending from said frame, said frame having first and second flanges extending therefrom so that when said feeder assembly is disposed in said cage bottom said flanges are supported by only two opposed walls of said walls; and
    a bonnet dimensioned and sized for sealing said open top end of said cage bottom being comprised of three elements a top element, a filter element and a filter retainer element; and
    wherein said at least one support is dimensioned to support a water bottle in a substantially vertical position relative to said frame;
    wherein said filter retainer element has pressing means to secure said filter element in place against the upper surface of said top element;
    wherein said top element has a bottom side and a receiving portion formed therein, said feeder assembly further comprising an upwardly extending lip disposed on said frame, wherein said lip is received by said receiving portion thereby preventing the rodents from accessing said at least one support from above;
    wherein said cage bottom is constructed of plastic.

2. The rodent cage of claim 1, wherein said floor of said cage bottom has an area of approximately 80 square inches.

3. The rodent cage of claim 1, wherein said frame of said feeder assembly has at least a second support descending from said frame.

4. The rodent cage of claim 1, wherein said at least one support forms a polygon.

5. The rodent cage of claim 1, wherein said feeder assembly is constructed from transparent plastic.

6. The rodent cage of claim 1, wherein said support has an open lower end and further comprising a snap on bottom, said snap on bottom being selectively connected to said lower end of said at least one support.

7. The rodent cage of claim 6, wherein said snap on bottom is a food container.

8. The rodent cage of claim 6, wherein said snap on bottom is a water bottle support.

9. The rodent cage of claim 1, further comprising a water bottle disposed on said at least one support.

10. The rodent cage of claim 9, wherein said water bottle further comprises a main body, said main body having a pair of molded recesses for inserting said water bottle into and removing said water bottle from said at least one support.

11. The rodent cage of claim 10, wherein said main body and said at least one support are substantially the same shape.

12. The rodent cage of claim 1, wherein said top has a surface, said surface being perforated for allowing air to pass to and from said cage bottom.

13. The rodent cage of claim 1, wherein said top has a perimeter and further comprises a vertical portion descending from said perimeter of a surface, and a border horizontally extending from said vertical portion, wherein when said top is placed on said cage bottom, said border contacts said peripheral lip thereby substantially sealing said cage bottom.

14. The rodent cage of claim 13, wherein said cage bottom further comprises a rim vertically descending from said peripheral lip, and said top further comprises a skirt vertically descending from said border, wherein when said top is placed on said cage bottom, said skirt extends around said rim thereby creating a circuitous path for the movement of air from inside said cage bottom to outside said cage bottom.

15. The rodent cage of claim 1, wherein said top element is constructed from stainless steel.

16. The rodent cage of claim 1, wherein said top has a plurality of cross beams and further comprises a filter disposed on said plurality of cross beams for filtering air entering said cage bottom through said top element.

17. The rodent cage of claim 16, wherein said filter retainer element is disposed on said filter, said filter retainer element having a perforated surface for allowing air to pass to and from said cage bottom.

18. The rodent cage of claim 17, wherein said filter retainer has a descending border, said descending border of said filter retainer element having a plurality of windows, said top further comprising a plurality of detents protruding from a rim of said top element, said windows receiving said detents to secure said filter retainer to said top.

19. The rodent cage of claim 17, wherein said filter retainer has a bottom side, a track protrudes from said bottom side of said filter retainer and compresses said filter against said top for securing said filter in place maintaining integrity of filtered air entering into the cage.

20. The rodent cage of claim 1, further comprising a lock for locking said top to said cage bottom.

21. The rodent cage of claim 20, wherein said lock comprises a lock bar, said lock bar rotatable from an unlocked position to a locked position.

22. The rodent cage of claim 21, wherein said lock further comprises a visual alert, wherein when said lock is in said unlocked position said visual alert is visible and when said lock is in said locked position, said visual alert is not visible.

23. The rodent cage of claim 1, wherein said pressing means is comprised of a track protruding from the bottom surface of said filter retainer.

24. A cage level barrier rodent cage, comprising:

a cage bottom having a plurality of integral side walls, a floor and an open top end, and a peripheral lip extending continuously around said open top end;

a feeder assembly having a frame and at least one support descending from said frame, said frame having first and second flanges extending therefrom, said flanges being supported by said cage bottom on a portion of two opposed integral walls; and, a bonnet dimensioned and sized for sealing said open top end of said cage bottom, said bonnet including a filter element, said bonnet protecting said filter element without a wire bar lid, said bonnet being comprised of two additional elements a top element and a filter retainer element; and wherein said at least one support is dimensioned to support a water bottle in a substantially vertical position relative to said frame;

wherein said top element has a bottom side and a receiving portion formed therein, said feeder assembly further comprising an upwardly extending lip disposed on said frame, wherein said lip is received by said receiving portion thereby preventing the rodents from accessing said at least one support from above;

wherein said filter retainer element has pressing means to secure said filter element in place against the upper surface of said top element; and wherein said cage bottom is constructed of plastic.

25. The cage level barrier level rodent cage of claim 24, wherein said floor of said cage bottom has an area of approximately 80 square inches.

26. The cage level barrier rodent cage of claim 24, further comprising a water bottle disposed in said at least one support.

27. The cage level barrier rodent cage of claim 24, wherein said bonnet includes said top element capable of covering said top end of said cage bottom.

28. The cage level barrier rodent cage of claim 27, wherein said top has a surface, said surface being perforated for allowing air to pass to and from said cage bottom.

29. The cage level barrier rodent cage of claim 28, wherein said top has a perimeter and further comprises a vertical portion descending from said perimeter of said surface, and a border horizontally extending from said vertical portion, wherein when said top is placed on said cage bottom, said border contacts said peripheral lip thereby substantially sealing said cage bottom.

30. The cage level barrier rodent cage of claim 27, further comprising a lock for locking said top to said cage bottom.

31. The rodent cage of claim 24, wherein said pressing means is comprised of a track protruding from the bottom surface of said filter retainer.

* * * * *